May 18, 1943. W. T. BARRANS ET AL 2,319,198
APPARATUS FOR SLITTING AND CUTTING CONDUCTORS
Filed Sept. 24, 1940 4 Sheets-Sheet 4

INVENTORS
W. T. BARRANS
P. M. COLE
D. O. HANNAN
D. C. ROBSON
BY
E. R. Nowlan
ATTORNEY Patented May 18, 1943

2,319,198

UNITED STATES PATENT OFFICE 2,319,198

APPARATUS FOR SLITTING AND CUTTING CONDUCTORS

William T. Barrans, Towson, Md., Paul M. Cole, Meadville, Pa., and Dan O. Hannan and Duer C. Robson, Baltimore, Md., assignors to Western Electric Company, Incorporated, New York, N. Y., a corporation of New York Application September 24, 1940, Serial No. 358,132

9 Claims. (Cl. 164—61)

This invention relates to an apparatus for slitting and cutting conductors and more particularly to an apparatus for cutting conductors to predetermined length and slitting the insulation at the ends to facilitate removing the insulation from the ends.

In connecting a conductor to an electrical terminal the insulation must be removed from the end of the conductor.

An object of the present invention is to provide an apparatus for effectively cutting conductors and slitting the insulation adjacent the cut ends.

Other objects and advantages will appear as the description proceeds.

In accordance with one embodiment of the invention an apparatus is provided for slitting the insulation on a length of conductor making a deeper cut in the middle of the slit length and then cutting the conductor at the middle point of the deep cut to provide two ends of conductors in which the insulation is slit longitudinally at the ends and having a deep cut adjacent each end.

A complete understanding of the invention may be had by reference to the following description taken in conjunction with the accompanying drawings, in which Fig. 1 is a side elevation of an apparatus embodying the invention;

Figure 1:
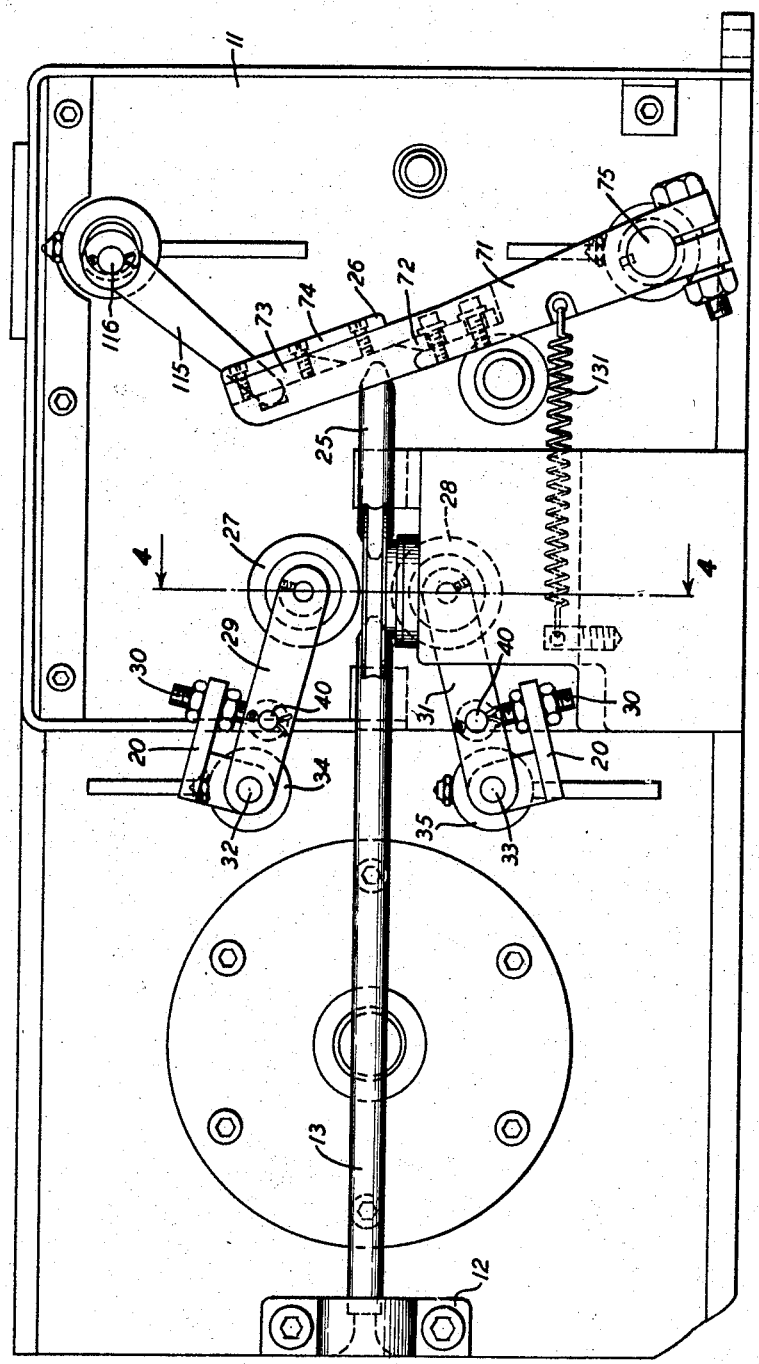
Figure 2:
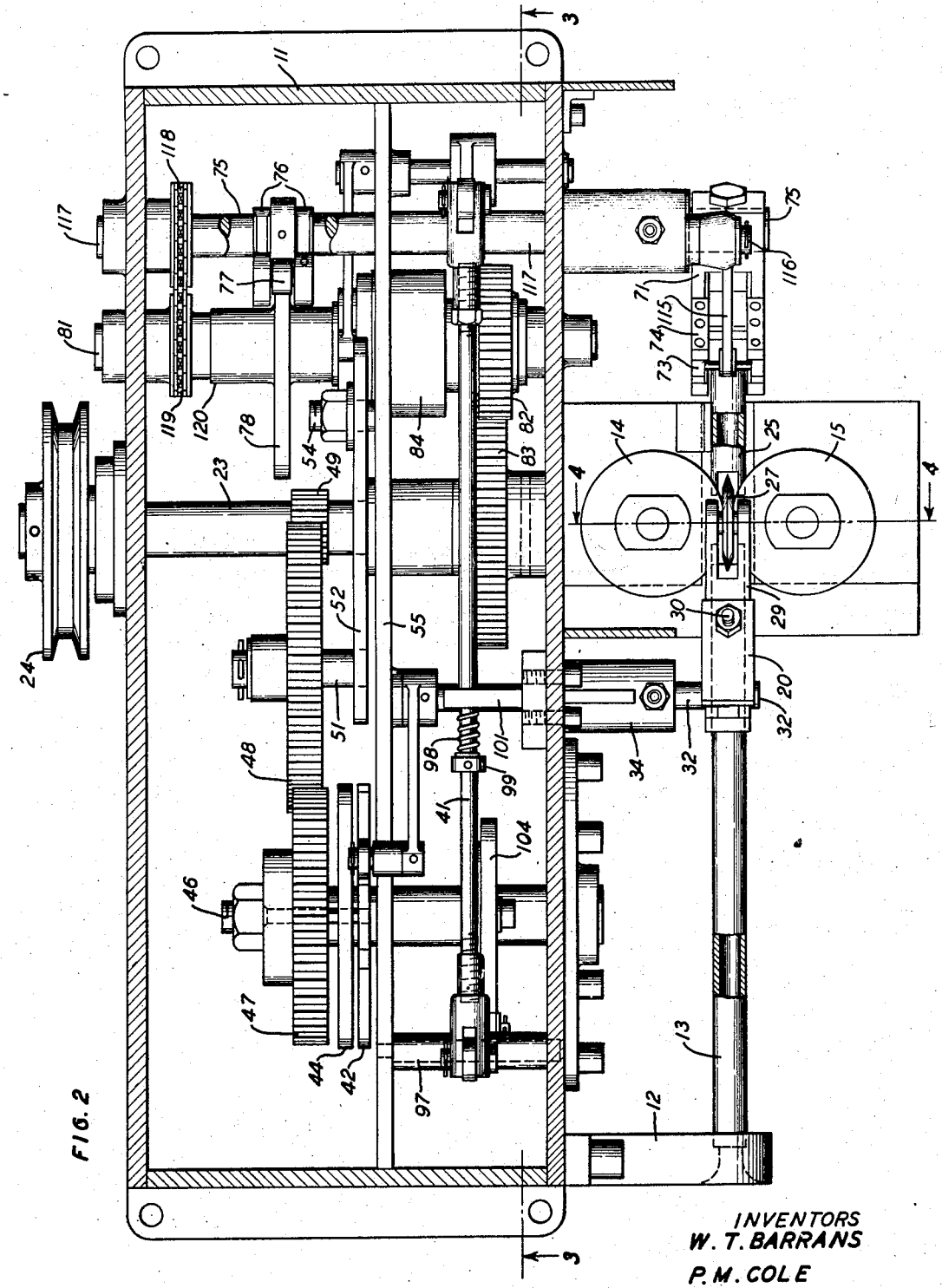
Fig. 2 is a sectional plan view of the apparatus shown in Fig. 1.
Figure 3:
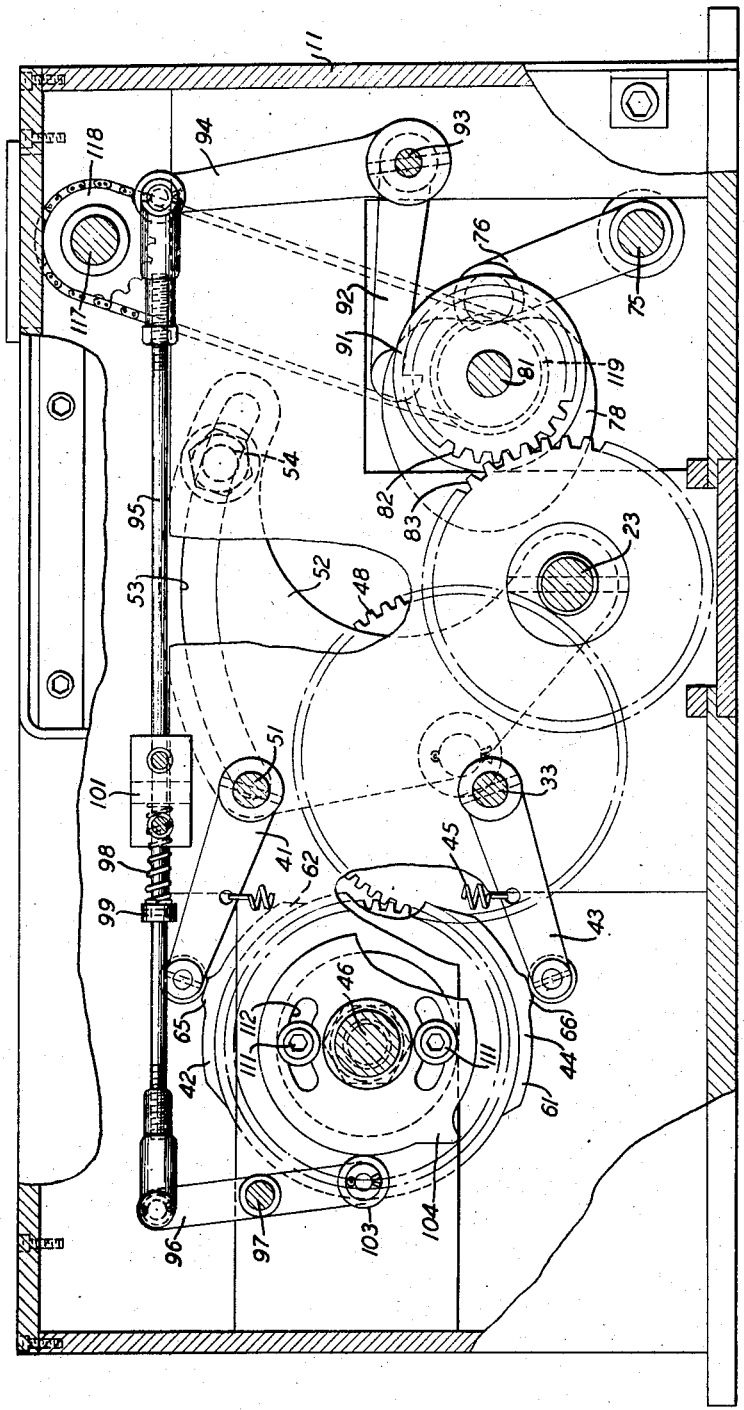
Fig. 3 is a vertical section taken on line 3—3 of Fig. 2.
Figure 4:
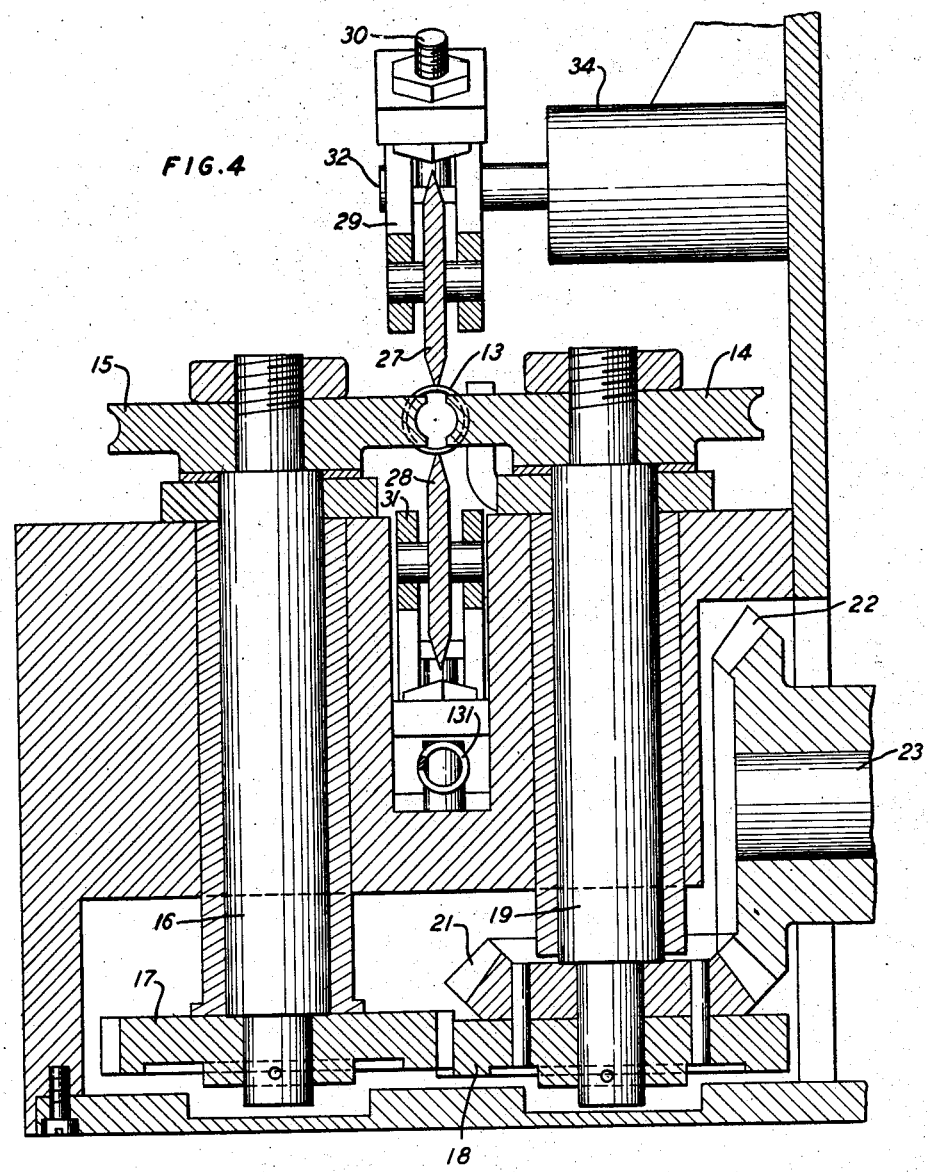
Fig. 4 is a vertical section taken on line 4—4 of Fig. 1.
Figure 5:
Fig. 5 is a detail view of a portion of a conductor longitudinally slit as it appears prior to severing the conductor in two.

Referring now more in detail to the drawings Fig. 1 shows a housing 11 to which a bracket 12 is attached carrying a tube 13 through which the conductor to be slit and cut is passed from left to right. The forward end of tube 13 is tapered as shown in Fig. 1 and leads the conductor between two advancing pulleys 14 and 15, which are grooved to engage the conductor and hold it firmly in position while advancing the conductor forwardly through the machine. The pulley 15 is mounted on a shaft 16 having a gear 17 at its opposite end meshing with a gear 18 on shaft 19 which carries the pulley 14. The shaft 19 also has a bevelled gear 21 mounted thereon meshing with a beveled gear 22 on the main drive shaft 23. The main drive shaft extends through the housing 11 and has a pulley 24 mounted thereon through which the apparatus is driven. From the pulleys 14 and 15 the conductor passes into a short tube 25 guiding the conductor to a flying cutter 26. The slitting of the insulation on the conductors is accomplished by a pair of disk cutters 27 and 28 mounted on pairs of arms 29 and 31 respectively. The disk cutters 27 and 28 do not rotate since it has been found that the depth of cutting can be better controlled if the disks are stationary and they are made in disk form only to permit a slight rotation of the disks when a portion of the cutting edges has become dull. The arms 29 and 31 are loosely mounted on shafts 32 and 33 respectively, which are journalled in bearings 34 and 35 mounted on the housing of the apparatus. Secured to each of the shafts 32 and 33 is a bell crank shaped arm 20 carrying a bolt 30 having a transverse portion 40 secured to arms 29 and 31 respectively. By adjusting the nuts on bolts 30 the spacing of the cutting disks can be adjusted relative to the conductor. Within the housing the shaft 32 has a cam arm 41 mounted thereon the roller cam at the end of which rides upon a cam 42. Similarly the shaft 33 has a cam arm 43 mounted thereon the roller cam at the end of which rides upon a cam 44. The cam arms 41 and 43 are held in engagement with their respective cams by a spring 45 which has a tendency to withdraw the cutting knives 27 and 28 from the conductor. Cams 42 and 44 are mounted upon a shaft 46 and are driven through a gear 47 mounted thereon. The gear 47 meshes with a gear 48 which meshes with a gear 49 on the main shaft 23. The gear 48 is an idler gear and is rotatably mounted on a shaft 41 secured to a segmental plate 52 which pivots about the main shaft 23. The plate 52 has an arcuate slot 53 therein and is normally held in fixed position by a bolt 54 in a central wall 55 of the housing. Thus the gear 48 may be interchanged for gears of different size to vary the length of cords being cut. When a cord is being drawn through the apparatus by the pulleys 14 and 15 the cam arms 41 and 43 first engage their respective cams at their smallest diameter. The cams 42 and 44 as viewed in Fig. 3 rotate in a clockwise direction and when the raised portions 61 and 62 of the leading edges of the raised portions of the cam come in contact with the rollers on the cam arms, the cutting disks 27 and 28 engage the insulation on the conductor which is firmly held in place by the pulleys 14 and 15 cutting a longitudinal slit therein which does not completely penetrate the insulation to be removed.

The reason for setting the cutting disks so that they will not completely penetrate the insulation is that if they were set to cut completely through the insulation there would be danger of cutting into the individually insulated conductors within the outer insulating sheath or if the apparatus were used in slitting a single conductor the cutting disks might cut into and damage the conductor itself. After a certain length of the conductor has been slit in this manner the cam rollers come in contact with the high portion 65 and 66 of their respective cams causing the cutting disks to move closer to the conductor and completely cut through the insulation to be removed. If the cutting disks at this time should cut into the individual insulation of the conductors in the outer insulating sheath it will do no harm because this will be immediately adjacent the ends of the conductor after the conductor is cut at the mid-point of the deepest slit. Upon further rotation of cams 42 and 44 the cam rollers again come in contact with a lower portion of the cam cutting a further slit of a depth not entirely through the outer insulation and upon still further rotation of the cam the cam rollers will again come in contact with the smallest diameter portion of the cam at which time the cutting disks will be out of contact with the conductor. The slit conductor now continues through the tube 25 between the cutters of the flying cutter 26 which moves with the conductor and cuts the conductor during movement thereof. The flying cutter comprises an arm 71 having a fixed cutting blade 72 mounted thereon and a sliding cutting blade 73 positioned between a flat portion of the arm and a plate 74. The arm 71 is mounted on a shaft 75 having cam arms 76 thereon within the housing. These arms carry a cam roller 77 which rides upon a cam 78. It will be noted that for each rotation of the cam 78 the arm 71 of the flying cutter will oscillate in a forward and backward movement. The cam 78 is rotatably mounted upon a shaft 81 driven by means of a gear 82 mounted on a shaft and meshing with a gear 83 on the main shaft 23. The shaft 81 therefore rotates continuously. However, the cam 78 will rotate only when clutched to the cam by a clutch 84. A portion of this clutch comprises a disk 91 having a notch in its periphery which may be engaged by a hook on the end of an arm 92 on a shaft 93. When the hook on the end of arm 92 engages the notch in the disk 91 of the clutch the cam 78 will be disengaged from the shaft and will not rotate therewith. Clutches of this type are well known on the market and a detailed description of the clutch will therefore not be given herein. In order to engage the clutch so that the cam 78 will rotate with shaft 81 the shaft 93 is rotated clockwise as viewed in Fig. 3 by an arm 94 on the same shaft. This arm is actuated by a rod 95 the opposite end of which is connected to a lever 96 pivoted at 97. The rod 95 is adjustable in length and is urged constantly to the left as viewed in Fig. 3 by a spring 98 resting at one end against a ring 99 secured to the rod and at its opposite end on a support 101 secured to the housing. The lower end of lever 96 carries a cam roller 103 which rides upon a cam 104 on the same shaft 46 which carries cams 42 and 44. When the high point of the cam 104 engages the cam roller 103 the hook on the end of arm 92 will be disengaged from the clutch disk 91 allowing the clutch to engage and drive cam 78 to operate the flying cutter 26.

In order to time the cutting action of the flying cutter so that it will cut in the middle of the deep part of the slit of the conductor the cam 104 may be adjusted circumferentially of the shaft 46 by means of bolts 111 set in a disk mounted on shaft 46. By reason of the arcuate slots 112 the cam 104 may be rotated to adjust its high point and then clamped to the disk on the shaft by tightening up the nuts on the bolts 111. When the arm 71 of the flying cutter moves forwardly or clockwise as viewed in Fig. 1, the upper cutting blade 73 is moved downwardly by an arm 115 mounted on an eccentric pin 116. The eccentric pin is located on the end of a shaft 117 driven by a sprocket wheel 118 from a chain engaging a sprocket wheel 119 on a sleeve 120 integral with the cam 78. Thus the shaft 117 will be driven only when the cam 78 is driven to operate the flying cutter. The eccentric pin 116 is so disposed on the shaft 117 that during the forward movement of the flying cutter the eccentric pin will be in its lower position causing the cutting blade 73 to cut the conductor. However upon the reverse movement of the arm 73 the eccentric pin will be in its upper position so that the cutting blade 73 will not again cut the conductor on the return movement of arm 71. The arm 71 is held in its normal inoperative position by a spring 131.

Figure 6:
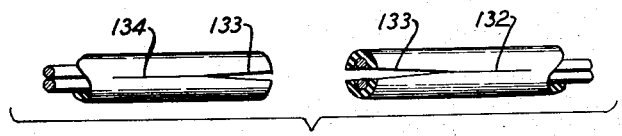
Fig. 6 is a detail view of the conductor shown in Fig. 5 after being cut.

In the operation of the apparatus a conductor is advanced through the apparatus by the pulleys 14 and 15 whereupon the cutting disks 27 and 28 at a predetermined time cut a shallow slit on 132 into the outer insulation of the covering. Upon further advance of the cord the cutting disks move in and cut a deeper slit 133 into the conductor and upon still further advance of the conductor another shallow slit 134 is cut into the conductor. Then as the conductor advances between the flying cutter 26 the cutting operation is so timed as to cut the conductor at the mid-point of the deep slit as shown in Fig. 6. In order to remove the outer insulation from an end of the conductor as shown in Fig. 6, the completely severed ends of the insulation may be grasped by hand and with a slight pull the insulation will separate readily to the end of the shallow slit where the insulation may be then completely removed by any well known means. The apparatus therefore will cut measured lengths of a conductor and prepare the ends for ready removal of the insulation.

It will be understood that the nature and embodiment of the invention herein disclosed are merely illustrative and that many changes and modifications may be made therein without departing from the spirit and scope of the invention.

What is claimed is:

1. In an apparatus for working covered strand material, means for advancing the material, means for intermittently slitting a length of the covering while it is being advanced, and means for severing the covered strand at a point where the covering was slit while said strand is being advanced through the slitting means.

2. In an apparatus for working covered strand material, means for advancing the material, means for intermittently cutting a slit in the covering which is deeper at one point than at another while the material is being advanced, and means for severing the covered strand at a point having a deep cut while the material is being advanced through the first mentioned cutting means.

3. In an apparatus for working covered strand material, means for advancing said strand, a cutting device for slitting a length of the covering, and actuating mechanism for said cutting device including a cam for advancing the cutting device toward said covering to cut a slit therein of predetermined length and depth.

4. In an apparatus for working covered strand material, means for advancing said strand, a cutting device for slitting a length of the covering, actuating mechanism for said cutting device including a cam for advancing the cutting device toward said covering to cut a slit there of predetermined length and depth, and a movable cutter for severing the advancing strand at a point where the covering is slit.

5. In an apparatus for working covered strand material, means for advancing said strand, a cutting device for slitting a length of the covering, actuating mechanism for said cutting device including a cam for advancing the cutting device toward said covering to cut a slit therein of predetermined length and depth, a movable cutter for severing the advancing strand, and means for actuating said cutter including a clutch operable to actuate the cutter to sever the strand at a point where the covering is slit.

6. In an apparatus for working covered strand material, means for longitudinally cutting said covering, means for transversely severing said strand, means for advancing the strand, and a pair of cams, one of said cams being effective to control the operation of said longitudinal cutting means, and the other of said cams being effective to control the operation of said transverse severing means.

7. In an apparatus for working covered strand material, means for advancing the material, means for intermittently slitting a length of the covering longitudinally, and cutting means operated in synchronism with said slitting means comprising a pair of arms pivotally mounted on opposite sides of the material, cutting means positioned on one of said arms, and means for actuating said cutting means in order to sever the material.

8. In an apparatus for working covered strand material, means for advancing said strand, a cutting device for longitudinally slitting a length of the covering comprising a plurality of cutting means pivotally mounted on opposite sides of the path of the material, and cam means for advancing the cutting device a predetermined distance toward said covering to cut a slit therein of predetermined length and depth.

9. In an apparatus for working covered strand material means for cutting the covering longitudinally, means for cutting the covered strand material transversely, and means positively driven by said longitudinal cutting means for actuating said transverse cutting means at predetermined intervals in synchronism with said longitudinal cutting means in order to sever predetermined lengths of the material.

WILLIAM T. BARRANS.
DAN O. HANNAN.
DUER C. ROBSON.
PAUL M. COLE.